US009904098B2

(12) United States Patent
Ueno et al.

(10) Patent No.: US 9,904,098 B2
(45) Date of Patent: Feb. 27, 2018

(54) HARD COAT FILM, POLARIZING PLATE, AND IMAGE DISPLAY APPARATUS

(71) Applicant: NITTO DENKO CORPORATION, Ibaraki-shi, Osaka (JP)

(72) Inventors: Tomonori Ueno, Ibaraki (JP); Atsushi Kishi, Ibaraki (JP); Hiroki Kuramoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 642 days.

(21) Appl. No.: 14/247,292

(22) Filed: Apr. 8, 2014

(65) Prior Publication Data
US 2014/0335351 A1    Nov. 13, 2014

(30) Foreign Application Priority Data

May 13, 2013  (JP) .................................. 2013-101246
Mar. 27, 2014 (JP) .................................. 2014-065457

(51) Int. Cl.
G02B 5/30       (2006.01)
G02F 1/133      (2006.01)
G02F 1/1335     (2006.01)
G02B 1/14       (2015.01)
G02B 1/115      (2015.01)

(52) U.S. Cl.
CPC ......... G02F 1/133528 (2013.01); G02B 1/14 (2015.01); G02B 5/30 (2013.01); G02B 1/115 (2013.01); G02F 2201/50 (2013.01); Y10T 428/269 (2015.01); Y10T 428/31891 (2015.04)

(58) Field of Classification Search
None
See application file for complete search history.

(56) References Cited

U.S. PATENT DOCUMENTS

| | | |
|---|---|---|
| 6,417,619 B1 | 7/2002 | Yasunori et al. |
| 7,371,439 B2 | 5/2008 | Matsunaga et al. |
| 7,910,033 B2 | 3/2011 | Kamata et al. |
| 7,927,533 B2 | 4/2011 | Kamiya et al. |
| 8,087,967 B2 | 1/2012 | Shinya et al. |
| 8,152,945 B2 | 4/2012 | Toyoda et al. |
| 8,152,947 B2 | 4/2012 | Toyoda et al. |
| 8,432,516 B2 | 4/2013 | Toyoda et al. |
| 8,773,624 B2 | 7/2014 | Shinya et al. |
| 8,821,966 B2 | 9/2014 | Toyoda et al. |
| 9,005,750 B2 | 4/2015 | Ozawa et al. |
| 9,182,522 B2 * | 11/2015 | Kishi ................... G02B 1/105 |
| 9,348,062 B2 | 5/2016 | Toyoda et al. |
| 9,354,462 B2 | 5/2016 | Toyoda et al. |
| 9,423,638 B2 | 8/2016 | Shinya et al. |
| 9,599,847 B2 | 3/2017 | Shinya et al. |
| 9,720,134 B2 | 8/2017 | Shibata et al. |
| 2006/0057307 A1 | 3/2006 | Matsunaga et al. |
| 2008/0182038 A1 | 7/2008 | Matsunaga et al. |
| 2009/0061114 A1 | 3/2009 | Ando |
| 2009/0169859 A1 * | 7/2009 | Biteau ................. G02B 3/0087 428/304.4 |
| 2009/0186552 A1 | 7/2009 | Shinya et al. |
| 2009/0296033 A1 | 12/2009 | Shinya et al. |
| 2010/0003425 A1 | 1/2010 | Kamata et al. |
| 2010/0033661 A1 | 2/2010 | Shinya et al. |
| 2010/0043965 A1 | 2/2010 | Kamiya et al. |
| 2010/0097552 A1 | 4/2010 | Shinya et al. |
| 2010/0097746 A1 | 4/2010 | Toyoda et al. |
| 2010/0098839 A1 | 4/2010 | Toyoda et al. |
| 2010/0118245 A1 | 5/2010 | Toyoda et al. |
| 2010/0134713 A1 | 6/2010 | Toyoda et al. |
| 2010/0178834 A1 | 7/2010 | Toyoda et al. |
| 2010/0208350 A1 | 8/2010 | Yoshihara |
| 2010/0210166 A1 | 8/2010 | Toyoda et al. |
| 2010/0227085 A1 | 9/2010 | Yoshihara |
| 2011/0242654 A1 | 10/2011 | Asahi et al. |
| 2012/0107518 A1 | 5/2012 | Matsunaga et al. |
| 2012/0107605 A1 | 5/2012 | Ozawa et al. |
| 2012/0118483 A1 | 5/2012 | Toyoda et al. |
| 2013/0029118 A1 * | 1/2013 | Kishi ................... G02B 1/105 428/212 |
| 2014/0227482 A1 | 8/2014 | Shibata et al. |
| 2014/0256207 A1 | 9/2014 | Toyoda et al. |
| 2014/0287153 A1 | 9/2014 | Toyoda et al. |
| 2014/0329431 A1 | 11/2014 | Shinya et al. |
| 2015/0253598 A1 | 9/2015 | Shinya et al. |
| 2016/0011454 A1 | 1/2016 | Toyoda et al. |
| 2016/0116789 A1 | 4/2016 | Toyoda et al. |
| 2016/0349550 A9 | 12/2016 | Shinya et al. |
| 2017/0131589 A1 | 5/2017 | Shinya et al. |

FOREIGN PATENT DOCUMENTS

| | | |
|---|---|---|
| CN | 101038346 A | 9/2007 |
| CN | 101379416 A | 3/2009 |

(Continued)

OTHER PUBLICATIONS

Office Action dated Dec. 22, 2016, issued in counterpart Chinese Application No. 201410200377.1, with English translation. (13 pages).
Office Action dated Jul. 25, 2017, issued in counterpart Taiwanese Application No. 103115995, with English translation. (14 pages).
Office Action dated Aug. 17, 2017, issued in counterpart Chinese Application No. 201410200377.1, with English translation. (13 pages).
Office Action dated Sep. 13, 2017, issued in counterpart Japanese Application No. 2014-065457, with English translation. (8 pages).
Office Action dated Nov. 15, 2017, issued in counterpart Japanese Application No. 2014-065457, with English translation. (6 pages).

Primary Examiner — Sheeba Ahmed
(74) Attorney, Agent, or Firm — Westerman, Hattori, Daniels & Adrian, LLP

(57) ABSTRACT

Provided is a hard coat film, including: a transparent film; and a hard coat layer formed on the transparent film, in which: the surface free energy of the hard coat layer is equal to or more than a certain value; the hard coat film has a mixed region in which a component of the transparent film and a component of the hard coat layer are mixed; the refractive index of the mixed region continuously changes toward the thickness direction of the hard coat film; and a refractive index change gradient falls within a certain range.

10 Claims, 5 Drawing Sheets

(56) References Cited

FOREIGN PATENT DOCUMENTS

| | | | |
|---|---|---|---|
| CN | 102473480 | A | 5/2012 |
| CN | 102844684 | A | 12/2012 |
| JP | 11-7251 | A | 1/1999 |
| JP | 11-103192 | A | 4/1999 |
| JP | 2006-106714 | A | 4/2006 |
| JP | 2011-225846 | A | 11/2011 |
| JP | 2011-237789 | A | 11/2011 |
| TW | 200405030 | A | 4/2004 |
| TW | 200914923 | A | 4/2009 |
| TW | 201300236 | A1 | 1/2013 |
| WO | WO2011/129354 | A1 * | 10/2011 |

* cited by examiner

HARD COAT FILM, POLARIZING PLATE, AND IMAGE DISPLAY APPARATUS

BACKGROUND OF THE INVENTION

1. Field of the Invention

This application claims priority under 35 U.S.C. Section 119 to Japanese Patent Application No. 2013-101246 filed on May 13, 2013 and Japanese Patent Application No. 2014-065457 filed on Mar. 27, 2014, which are herein incorporated by reference.

The present invention relates to a hard coat film, and a polarizing plate and an image display apparatus each including the film.

2. Description of the Related Art

Hitherto, each of optical members such as a polarizing plate, and a screen and/or touch panel of an image display apparatus has been provided with a hard coat film in some cases for preventing flawing or light reflection in such member. The hard coat film includes a transparent film and a hard coat layer formed on the transparent film. The hard coat layer is typically formed of a thin coating film obtained by forming a hard coat layer-forming material containing, for example, a thermosetting resin or an ionizing radiation-curable resin such as a UV-curable resin into a film.

A considerable difference in refractive index between a transparent film and a hard coat layer exists in a related-art hard coat film. Accordingly, the presence of slight unevenness on a surface of the hard coat layer involves a problem in that an interference fringe occurs. It should be noted that the interference fringe is a striped patterned external appearance resulting from reflection of light from a three-wavelength light source such as a fluorescent lamp that has impinged on, for example, the surface of the hard coat layer. Such interference fringe involves a problem in that the interference fringe is responsible for a reduction in visibility of the surface of the hard coat film.

In addition, interlayer filling is adopted for the surface of the hard coat film in some cases for improving its visibility. To that end, the hard coat film needs to be made compatible with the interlayer filling. Specifically, in order that a state where an interlayer filler is uniformly applied may be maintained for a long time period, application property of the hard coat film needs to be improved so that the interlayer filler may not be repelled by the surface of the hard coat layer.

A method involving performing surface modification treatment based on hydrophilization is available as a method of making the hard coat film compatible with the interlayer filling. However, the method involves the following problem. The number of steps in its production increases to reduce productivity and its scratch resistance reduces.

In this context, the following hard coat film has been proposed as a method of preventing occurrence of the interference fringe (see Japanese Patent Application Laid-open No. 2011-237789). In a region from a space between a transparent film and a hard coat layer to a thickness-wise middle part of the hard coat layer, a refractive index continuously changes in the thickness direction. However, an attempt to make the hard coat film compatible with the interlayer filling involves a problem in that its scratch resistance reduces and an external appearance failure such as white haze occurs.

As described above, a hard coat film in which occurrence of an interference fringe is prevented and which is capable of interlayer filling has been demanded.

SUMMARY OF THE INVENTION

Therefore, an object of the present invention is to provide a hard coat film in which the occurrence of an interference fringe is prevented and which is compatible with interlayer filling.

In view of the foregoing, the inventors of the present invention have made extensive studies to solve the problems, and as a result, have found that the problems are solved by controlling a refractive index change in a range from a hard coat layer to a transparent film to a high degree and using a hard coat layer whose surface free energy is 30 mN/m or more. Thus, the inventors have completed the present invention.

A hard coat film of the present invention comprises a transparent film and a hard coat layer formed on the transparent film. The hard coat layer has a surface free energy of 30 mN/m or more. The hard coat film has a mixed region in which a component of the transparent film and a component of the hard coat layer are mixed. A refractive index of the mixed region continuously changes toward a thickness direction of the hard coat film. A refractive index change gradient a ($\mu m^{-1}$) specified in the formula (1) satisfies a relationship of $0.003 \leq a \leq 0.018$:

$$a = |n_A - n_B|/L \qquad (1)$$

in the formula (1), $n_A$ represents a refractive index intrinsic to the hard coat layer, $n_B$ represents a refractive index intrinsic to the transparent film, and L represents a thickness ($\mu m$) of the mixed region.

In one embodiment of the invention, the hard coat film has an interface produced by the component of the transparent film and the component of the hard coat layer, and the interface is detectable by analysis of a reflection spectrum.

In another embodiment of the invention, a surface of the hard coat layer has attached thereto a front surface plate through an interlayer filler.

In another embodiment of the invention, the $n_A$ and the $n_B$ satisfy a relationship of $0 \leq |n_A - n_B| \leq 0.42$.

In another embodiment of the invention, the thickness L of the mixed region is 2.0 $\mu m$ or more.

In another embodiment of the invention, the $n_A$ and the $n_B$ satisfy a relationship of $n_B < n_A$.

In another embodiment of the invention, the $n_A$ satisfies a relationship of $1.33 \leq n_A \leq 1.90$.

In another embodiment of the invention, the $n_B$ satisfies a relationship of $1.33 \leq n_B \leq 1.66$.

According to another aspect of the invention, a polarizing plate is provided. The polarizing plate comprises the hard coat film.

According to another aspect of the invention, an image display apparatus is provided. The image display apparatus comprises the hard coat film.

DETAILED DESCRIPTION OF THE PREFERRED EMBODIMENTS (1. Outline of Hard Coat Film)

A hard coat film of the present invention includes a transparent film and a hard coat layer formed on the transparent film. In addition, the surface free energy of the hard coat layer is 30 mN/m or more. Further, the hard coat film has a mixed region in which a component of the transparent film and a component of the hard coat layer are mixed. The refractive index of the mixed region continuously changes in the thickness direction of the hard coat film and a refractive index change gradient a ($\mu m^{-1}$) specified in the formula (1) satisfies a relationship of $0.003 \le a \le 0.018$.

$$a=|n_A-n_B|/L \quad (1)$$

In the formula (1), $n_A$ represents a refractive index intrinsic to the hard coat layer, $n_B$ represents a refractive index intrinsic to the transparent film, and L represents the thickness ($\mu m$) of the mixed region.

The mixed region is formed over a range from a boundary between the hard coat layer and the transparent film or the vicinity thereof to a thickness-wise middle part of the hard coat layer.

One end portion of the mixed region can exist in the thickness-wise middle part of the hard coat layer. The one end portion is distant from, for example, the boundary between the hard coat layer and the transparent film in the thickness direction of the hard coat layer by at least 40% with respect to the thickness of the hard coat layer, and the distance is preferably 60% or more, more preferably 80% or more. When the distance falls within such range, the effect of the invention of the present application is exhibited with additional reliability.

The other end portion of the mixed region may exist in any one of:
(1) the boundary between the hard coat layer and the transparent film (that is, the surface of the transparent film at the time point when a hard coat layer-forming material is applied);
(2) a transparent film side with respect to the boundary; and
(3) a hard coat layer side with respect to the boundary.

The other end portion may form an interface.

The aspects according to the above-mentioned items (1) to (3) are each described with reference to FIGS. 1 to 3, and still another embodiment is described with reference to FIG. 4. It should be noted that the invention illustrated in each figure is merely one aspect of the present invention.

Figure 1:
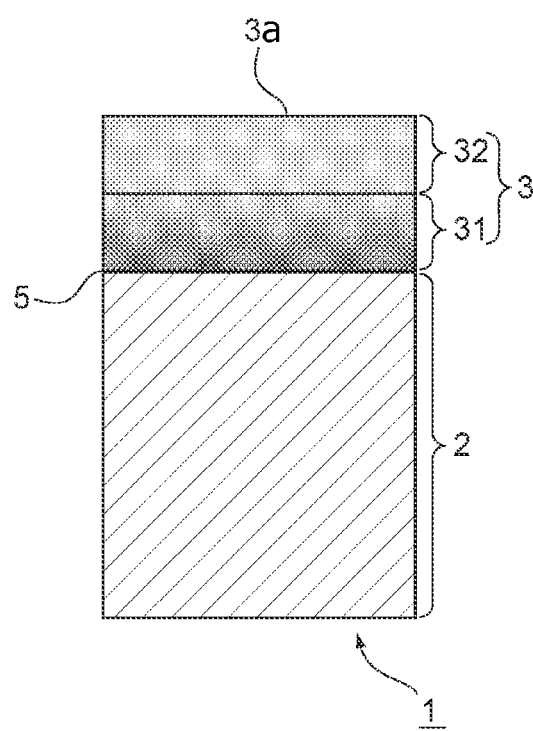
FIG. 1 is a schematic sectional view illustrating a hard coat film according to one embodiment of the present invention.

In FIG. 1, a hard coat film 1 according to one embodiment includes a transparent film 2 and a hard coat layer 3 formed on the transparent film 2. A region represented by reference symbol 31 in the figure is the mixed region. It should be noted that a thickness-wise middle part of the hard coat layer 3 does not mean the central portion in the thickness direction between an interface 5 and a surface 3a of the hard coat layer 3 (with regard to the term "middle part", the same holds true for the following). In one embodiment, the interface 5 exists at a boundary between the transparent film 2 and the hard coat layer 3. Details about the interface are described later in the section 1-3.

Figure 2:
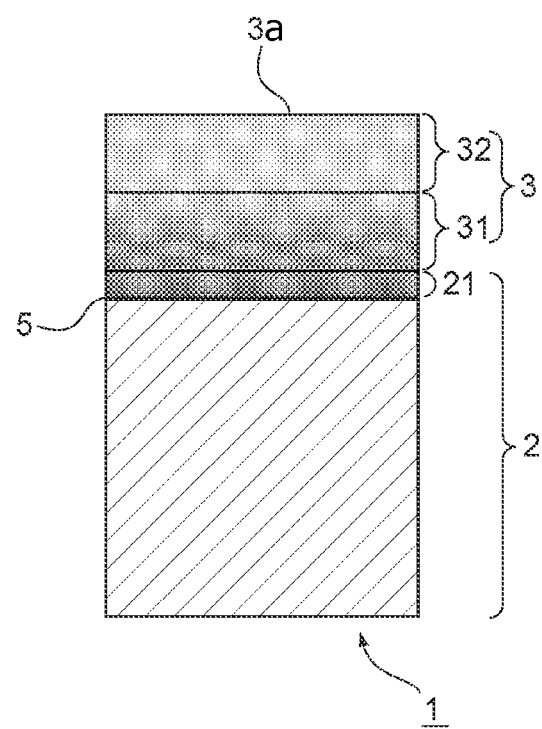
FIG. 2 is a schematic sectional view illustrating a hard coat film according to another embodiment of the present invention.

FIG. 2 illustrates a hard coat film according to another embodiment. In this embodiment, a mixed region is formed over a range from a portion of the transparent film 2 close to the hard coat layer 3 to the thickness-wise middle part of the hard coat layer 3. That is, the mixed region includes the mixed region 31 and a region represented by reference symbol 21 in the figure. When an interface exists, the interface 5 can exist in the portion of the transparent film 2 close to the hard coat layer 3. Hereinafter, the mixed region 31 is sometimes referred to as "first region" and the region represented by reference symbol 21 in the figure is sometimes referred to as "second region". It should be noted that the terms "first region" and "second region" as used herein are used only when the embodiment according to FIG. 2 is described.

Figure 3:
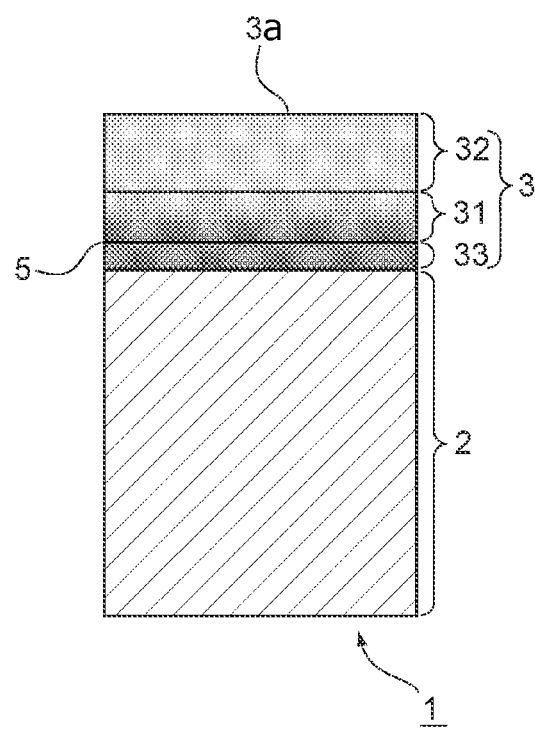
FIG. 3 is a schematic sectional view illustrating a hard coat film according to still another embodiment of the present invention.

FIG. 3 illustrates a hard coat film according to still another embodiment. In this embodiment, the mixed region 31 is formed over a range from a portion of the hard coat layer 3 close to the transparent film 2 to the thickness-wise middle part of the hard coat layer 3. In this embodiment, a transitional region 33 can be formed in the vicinity of the end portion of the hard coat layer 3 on the transparent film 2 side. In some cases, the interface 5 can be recognized between the mixed region 31 and the transitional region 33.

Figure 4:
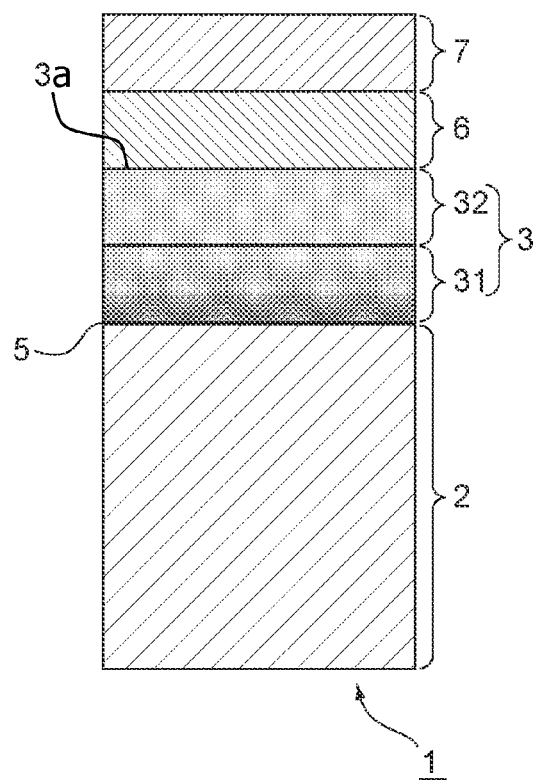
FIG. 4 is a schematic sectional view illustrating a hard coat film according to still another embodiment of the present invention.

FIG. 4 illustrates a hard coat film according to still another embodiment. In this embodiment, an interlayer filler 6 and a front surface plate 7 are provided in the stated order on the hard coat layer 3. Needless to say, this embodiment, which is illustrated as an embodiment in conformity with FIG. 1, may be an embodiment in conformity with FIG. 2 or FIG. 3.

It should be noted that in the hard coat film 1 illustrated in each of FIGS. 1 to 4, the hard coat layer 3 is formed on one surface of the transparent film 2. However, the hard coat layer may be formed on each of both surfaces of the transparent film (not shown).

(1-1. Mixed Region)

(Refractive Index Continuously Changes in Thickness Direction)

As described above, the refractive index of the mixed region continuously changes in the thickness direction of the hard coat film.

The phrase "continuously change" as used herein is a concept including the case where the refractive index is partially constant. More specifically, the phrase "continuously change" means that the refractive index of the mixed region does not have any discontinuous value in the thickness direction of the hard coat film. A refractive index change gradient b ($\mu m^{-1}$) specified in the formula (2) obtained by using refractive indices $n_X$ and $n_Y$ of the mixed region at two appropriate points X and Y in the thickness direction of the hard coat film satisfies, for example, a relationship of $0.003 \le b \le 0.018$, and preferably satisfies a relationship of $0.004 \le b \le 0.008$.

$$b=|n_X-n_Y|/D \quad (2)$$

In the formula (2), D represents a distance ($\mu m$) between the two points X and Y in the thickness direction.

Those refractive indices can be measured by a method involving using a prism coupler.

In the prism coupler, laser light is introduced into a thin film through a prism and a state where the intensity of the introduced light strengthens at a specific angle of incidence with certain periodicity (angle coinciding with a thin film waveguide condition) is detected.

In a thin film whose refractive index does not continuously change in its depth direction, the specific angle of incidence and its periodicity are uniquely determined from the refractive index and thickness of the thin film, and hence the refractive index and thickness of the thin film can be calculated from the resultant plurality of angles of incidence (called modes).

On the other hand, in a thin film whose refractive index changes in its depth direction, a gap resulting from the thin film waveguide condition occurs between the angle of incidence and the periodicity, and hence a refractive index change with respect to the depth direction of the thin film can be quantitatively determined by analyzing the gap.

(Refractive Index Change Gradient)

In the hard coat film, the refractive index change gradient a ($\mu m^{-1}$) specified in the formula (1) satisfies a relationship of $0.003 \le a \le 0.018$. In addition, the a more preferably satisfies a relationship of $0.004 \le a \le 0.008$. When the a falls within the range, the interference fringe of the hard coat film can be suppressed with additional reliability and additionally high scratch resistance is secured.

When $n_A < n_B$ in the formula (1), the $n_A$ preferably satisfies a relationship of $1.30 \le n_A \le 1.66$ and more preferably satisfies a relationship of $1.38 \le n_A \le 1.55$.

The $n_B$ preferably satisfies a relationship of $1.33 \le n_B \le 1.66$ and more preferably satisfies a relationship of $1.47 \le n_B \le 1.55$.

When the $n_A$ and the $n_B$ fall within such ranges, the interference fringe can be suppressed with additional reliability.

When the $n_A$ and the $n_B$ satisfy a relationship of $n_B < n_A$, the $n_A$ preferably satisfies a relationship of $1.33 \le n_A \le 1.90$ and more preferably satisfies a relationship of $1.47 \le n_A \le 1.74$.

The $n_B$ preferably satisfies a relationship of $1.33 \le n_B \le 1.66$ and more preferably satisfies a relationship of $1.47 \le n_B \le 1.55$.

When the $n_A$ and the $n_B$ fall within such ranges, the interference fringe can be suppressed with additional reliability.

The $n_A$ and the $n_B$ may satisfy a relationship of $n_A < n_B$ or $n_B < n_A$, and preferably satisfies a relationship of $n_B < n_A$. In this case, the interference fringe can be suppressed with additional reliability.

A value for $|n_A - n_B|$ typically satisfies a relationship of $0 \le |n_A - n_B| \le 0.42$, preferably satisfies a relationship of $0.03 \le |n_A - n_B| \le 0.26$, and more preferably satisfies a relationship of $0.04 \le |n_A - n_B| \le 0.10$. When the value falls within such range, the interference fringe can be suppressed with additional reliability.

The thickness L of the mixed region is typically 2.0 μm or more, preferably 3.0 μm or more, more preferably 4.5 μm or more. When the thickness falls within such range, the interference fringe can be suppressed with additional reliability.

(1-2. Hard Coat Layer)

The surface free energy of the hard coat layer is 30 mN/m or more, preferably 32 mN/m or more. When the surface free energy falls within the range, an application liquid easily spreads on the hard coat layer without being repelled and hence the compatibility with the interlayer filler of the hard coat layer can additionally increase. In addition, the need for performing surface modification treatment based on hydrophilization additionally reduces, and hence the problems of a reduction in productivity and a reduction in scratch resistance can be avoided with additional reliability. The surface free energy can be measured by a drop method. Details about the hard coat layer are described later in the section 3.

(1-3. Interface)

As described in the section 1, the hard coat film may have an interface. The interface can be formed by the component of the transparent film and the component of the hard coat layer. The interface can be detected by the analysis of a reflection spectrum.

Preferably only one interface that can be detected by the analysis of the reflection spectrum exists in the thickness direction of the hard coat film. Namely, an optical interface that can be detected by the analysis of the reflection spectrum except the one interface is preferably absent in the hard coat film. In other words, it is not preferred that two or more interfaces that can be detected by the analysis of the reflection spectrum exist in the hard coat film.

The phrase "can be detected by the analysis of the reflection spectrum" means that the interface can be detected with, for example, an instantaneous multi-photometric system (manufactured by Otsuka Electronics Co., Ltd., product name: "MCPD3700"). Specifically, the detection can be performed in accordance with a method described in the section (Method of confirming interface) to be described later.

Subsequently, further details about the hard coat film of the invention of the present application are described.

(2. Hard Coat Film)

The aspect of the hard coat film is more specifically described.

The hard coat film 1 may be formed into a predetermined shape (such as a rectangular shape in a planar view). The thickness of the hard coat film 1 is, for example, 20 μm to 1,000 μm, preferably 20 μm to 500 μm.

(2-1. Continuous Change of Refractive Index)

The continuous change of the refractive index in the mixed region can be realized by the fact that the amount of the component forming the transparent film reduces toward the surface 3a of the hard coat layer 3. The term "surface of the hard coat layer" as used herein refers to the surface of the hard coat layer laminated on the transparent film on a side opposite to the boundary between the hard coat layer and the transparent film.

A refractive index intrinsic to the transparent film 2 and a refractive index intrinsic to the hard coat layer 3 may be different from each other. The refractive index intrinsic to the transparent film 2 may be smaller or larger than the refractive index intrinsic to the hard coat layer 3.

The term "refractive index intrinsic to the transparent film 2" as used herein refers to a refractive index measured for the transparent film alone (transparent film in a state of not being provided with the hard coat layer). In addition, the term "refractive index intrinsic to the hard coat layer 3" as used herein refers to the refractive index of the hard coat layer alone (refractive index that the component forming the hard coat layer originally has).

Hereinafter, the component forming the transparent film (excluding the component forming the hard coat layer in the transparent film) is sometimes abbreviated as "film component", and the component forming the hard coat layer (excluding the component forming the transparent film in the hard coat layer) is sometimes abbreviated as "hard coat component".

It is theoretically desirable that a difference in refractive index between the transparent film 2 and the hard coat layer 3 be zero in order that the occurrence of the interference fringe may be prevented. However, it is in reality difficult to select such materials that the refractive index of the transparent film 2 and the refractive index of the hard coat layer 3 have the same value. The hard coat film 1 of the present invention is preferably of such a structure that the refractive index continuously changes in the thickness direction in the mixed region 31 and no interface exists in the mixed region 31. In this case, the occurrence of the interference fringe can be suppressed with additional reliability. It is also possible to use the transparent film 2 and the hard coat layer 3 the difference between the refractive indices of which is somewhat large. Specifically, the difference between the refractive indices intrinsic to the transparent film 2 and the hard coat layer 3 is, for example, 0 to 0.42, preferably 0.03 to 0.26. The difference between the refractive indices intrinsic to both the film and the layer is a difference in refractive index between the film component and the hard coat component.

In the present invention, the difference in refractive index between the transparent film 2 and the hard coat layer 3 is reduced by the mixed region. As described above, the occurrence of the interference fringe is suppressed when the refractive index change gradient a ($\mu m^{-1}$) specified in the formula (1) satisfies a relationship of $0.003 \leq a \leq 0.018$.

For example, when the refractive index intrinsic to the transparent film 2 is smaller than the refractive index intrinsic to the hard coat layer 3, the refractive index in the mixed region may gradually increase toward the surface 3a side of the hard coat layer 3. Namely, in the case of the aspect illustrated in each of FIGS. 1 to 4, the refractive index may continuously change from the interface 5 to the surface 3a side of the hard coat layer 3 with reference to the interface 5 so as to gradually become close to the refractive index intrinsic to the hard coat layer 3. On the other hand, when the refractive index intrinsic to the transparent film 2 is larger than the refractive index intrinsic to the hard coat layer 3, the refractive index in the mixed region 31 may gradually reduce toward the surface 3a side of the hard coat layer 3.

As described above, the film component and the hard coat component are typically mixed in the mixed region 31. The mixed region 31 may be formed by the transition of the film component to the hard coat layer 3. The amount of the film component in the mixed region 31 may reduce toward the surface 3a of the hard coat layer 3 without producing any interface based on the analysis of a reflection spectrum. Adhesiveness between the transparent film 2 and the hard coat layer 3 is excellent by virtue of the presence of the mixed region 31. Therefore, even when the hard coat film 1 is used for a long time period, the transparent film 2 and the hard coat layer 3 hardly peel off each other. Therefore, the hard coat film 1 is excellent in durability. In addition, the difference in refractive index between the transparent film 2 and the hard coat layer 3 is reduced by the presence of the mixed region 31. Therefore, in the hard coat film 1, an interference fringe resulting from the interface 5 between the transparent film 2 and the hard coat layer 3 is also suppressed.

A region 32 between the mixed region 31 and the surface 3a of the hard coat layer 3 (hereinafter sometimes referred to as "hard coat region") is substantially formed of the hard coat component. The hard coat layer 3 having a high hardness can be formed by the presence of the hard coat region 32 on the surface side of the hard coat layer 3. It should be noted that the hard coat region 32 may contain a slight amount of the film component in itself. The interface is also preferably absent between the mixed region 31 and the hard coat region 32. That is, in the hard coat layer 3, the mixed region 31 and the hard coat layer 32 are preferably connected to each other without producing any interface.

The transparent film 2 may contain the hard coat component in itself or may be free of the hard coat component.

When the transparent film 2 contains the hard coat component like the aspect illustrated in FIG. 2, the hard coat component is incorporated into a region from the boundary between the transparent film 2 and the hard coat layer 3 to a thickness-wise middle part of the transparent film 2. As a result, as described above, the mixed region includes the first region 31 and the second region 21. The second region 21 may be formed by the transition of the hard coat component to the transparent film 2.

When the transparent film 2 contains the hard coat component as illustrated in FIG. 2, the interface 5 may exist at the end portion of the second region 21 on a side opposite to the hard coat layer 3. It should be noted that the thickness-wise middle part of the transparent film 2 does not mean the central portion in the thickness direction between the boundary between the transparent film 2 and the hard coat layer 3, and the rear surface of the transparent film 2. In addition, the middle part can be considered in the same manner as in the middle part of the hard coat layer 3 in any other respect.

It is preferred that the amount of the film component in the second region 21 gradually reduce toward the surface 3a of the hard coat layer 3 without producing any interface based on the analysis of a reflection spectrum. It should be noted that the thickness of the second region 21 may be smaller than the thickness of the first region 31.

In the embodiment illustrated in FIG. 3, the transitional region 33 may be formed by the swelling or dissolution of the transparent film 2. In this case, the interface 5 may be recognized at the end portion of the transitional region 33 on a side closer to the hard coat layer 3 (substantially a side closer to the mixed region 31).

(2-2. Method of Confirming Interface)

A method of confirming the presence of an interface in the hard coat film is, for example, to measure a reflection spectrum in accordance with the following measurement method. Specifically, a black acrylic plate (manufactured by MITSUBISHI RAYON CO., LTD., thickness: 2.0 mm) is attached to the rear surface of the transparent film of each hard coat film through a transparent acrylic pressure-sensitive adhesive having a thickness of about 20 µm. The reflection spectrum of the surface of the hard coat layer of the hard coat film is measured under the following conditions with an instantaneous multi-photometric system (manufactured by Otsuka Electronics Co., Ltd., product name: "MCPD3700").

(Measurement Conditions)
Reference: AL
Algorithm: FFT method
Calculation wavelength: 450 nm to 950 nm
(Detector conditions)
Exposure time: 20 ms
Lamp gain: normal
Cumulative number: 1
(FFT method)
Range of detected film thickness values: 0.5 µm to 12.0 µm
Number of data: 212
Film thickness resolution: 24 nm
Bell function: used Suppose that the interface exists at a portion in which the peak of an intensity has appeared in the result of the measurement of the reflection spectrum. Specifically, the interface is regarded as being present when a value for the peak intensity is 5 or more. In addition, the value for the peak intensity is preferably 30 or less, more preferably 20 or less. When the value falls within the range, the occurrence of the interference fringe is suppressed with additional reliability.

(3. Hard Coat Layer)

The hard coat layer is preferably a layer having a hardness of H or more in a pencil hardness test. The hardness is preferably a value measured in conformity with the pencil hardness test of JIS K 5400.

The thickness of the hard coat layer is typically 1 μm to 30 μm, preferably 2 μm to 20 μm, more preferably 3 μm to 15 μm. In addition, in the hard coat layer having a hardness of 2H or more, the thickness is particularly preferably set to 3 μm to 15 μm. In this case, a suppressing effect on the interference fringe can be made additionally significant by adopting the structure of the present invention.

The hard coat layer is formed of, for example, a thin film obtained by applying a hard coat layer-forming material containing a solvent and a curable compound onto the transparent film, and curing the material. It is preferred that the solvent contain a good solvent for the transparent film and the curable compound contain a compound having a molecular weight of 800 or less. The term "good solvent" as used herein refers to a solvent having a function of dissolving the transparent film and the term "poor solvent" as used herein refers to a solvent that does not have any function of dissolving the transparent film. Herein, the compound having a molecular weight of 800 or less out of the curable compound is described as "low-molecular weight component having a molecular weight of 800 or less" or is simply described as "low-molecular weight component".

A solvent capable of dissolving the curable compound and the transparent film is preferably used as the good solvent. Examples of the solvent include: alcohols such as methanol, ethanol, isopropyl alcohol, butanol, and 2-methoxyethanol; ketones such as acetone, methyl ethyl ketone, and methyl isobutyl ketone; esters such as methyl acetate, ethyl acetate, and butyl acetate; ethers such as diisopropyl ether and propylene glycol monomethyl ether; glycols such as ethylene glycol and propylene glycol; cellosolves such as ethyl cellosolve and butyl cellosolve; aliphatic hydrocarbons such as hexane, heptane, octane, and cyclopentanone; and aromatic hydrocarbons such as benzene, toluene, and xylene. Those solvents may be used alone or in combination.

For example, when the transparent film is a triacetylcellulose film, as a good solvent for the film, there are given, for example, acetone, methyl ethyl ketone, cyclopentanone, ethyl acetate, and methyl acetate. When the transparent film is a triacetylcellulose film, as a poor solvent for the film, there are given, for example: alcohols such as isopropyl alcohol, butanol, and ethanol; and ethers such as butyl acetate and propylene glycol monomethyl ether. For example, when the transparent film is an acrylic film, as a good solvent for the film, there are given, for example, cyclopentanone, methyl ethyl ketone, methyl isobutyl ketone, butyl acetate, ethyl acetate, diacetone alcohol, and ethers such as tetrahydrofuran. When the transparent film is an acrylic film, as a poor solvent for the film, there are given, for example: alcohols such as isopropyl alcohol, butanol, and ethanol; and an aromatic hydrocarbon such as xylene. The good solvent alone or a mixed solvent obtained by mixing the good solvent and the poor solvent is preferably used as the solvent. The good solvent and the poor solvent can be appropriately selected depending on a material for the transparent film.

When the hard coat layer-forming material is applied onto the transparent film, while the solvent permeates the transparent film, the film component (e.g., a polymer forming the transparent film such as triacetylcellulose) is eluted and diffused by the permeation of the solvent. Thus, the mixed region in which the film component and the hard coat component (such as the curable compound) are mixed is produced. It is preferred that in association with the curing of the hard coat component, a region in which the amount of the film component reduces in a direction going away from the transparent film be produced in the mixed region. In addition, an interface may be formed. The interface may be detectable by the analysis of a reflection spectrum. The mixed region may have the interface at the end portion on a side opposite to the surface of the hard coat layer. It is not preferred that the mixed region have two or more interfaces. It should be noted that the evaporation rate of the solvent may also be involved in the permeation and the diffusion.

In particular, the solvent containing the good solvent easily permeates the transparent film to swell the film, thereby producing the film component. In addition, with regard to the curable compound containing the low-molecular weight component, the low-molecular weight component easily mixes into the film component and the film component easily diffuses. Accordingly, when the hard coat layer-forming material, which contains the solvent containing the good solvent and the curable compound containing the low-molecular weight component, is used, the difference in refractive index between the transparent film and the hard coat layer is reduced while the film component and the hard coat component form an interface. In addition, no interface other than the interface is produced and the amount of the film component reduces toward the surface of the hard coat layer. Such hard coat film suppresses the occurrence of the interference fringe with additional reliability.

The solvent can be appropriately selected in consideration of: the permeation rate at which the solvent permeates the transparent film and the diffusion rate at which the film component diffuses into the hard coat layer-forming material when the hard coat layer-forming material is applied to the transparent film; and a drying condition for the solvent. For example, the permeation rate is affected by the amount of the good solvent (and the poor solvent) with respect to the film component (e.g., a polymer forming the transparent film such as triacetylcellulose) or the like. The diffusion rate is affected by the molecular weight of the curable compound in the hard coat layer-forming material, the molecular weight of the component in the transparent film, the amount of a plasticizer in the transparent film, and the like.

The curable compound has only to be capable of forming a film having a sufficient strength and sufficient transparency. Examples of the curable compound include: a resin monomer or oligomer that cures with heat; and a resin monomer or oligomer that cures with an ionizing radiation. An ionizing radiation-curable resin monomer or oligomer can be used. In this case, such advantageous effects as described below are exhibited: good processability is obtained and heat damage is hardly done to the transparent film.

Examples of the resin monomer or oligomer that cures with heat include monomers and oligomers such as an acrylic resin, polycarbonate, and polystyrene. A resin that cures through the volatilization of a solvent with heat is also included in the category of a resin that cures with heat.

Typical examples of the ionizing radiation-curable resin monomer or oligomer include curable compounds each of which cures with UV light or an electron beam. An example of the ionizing radiation-curable resin monomer or oligomer is a monomer or oligomer having, for example, a polymerizable unsaturated linking group such as a (meth)acrylate group and a (meth)acryloyloxy group (the term "(meth) acrylate" used herein means an acrylate or/and a methacrylate); or an epoxy group in its molecule. It should be noted that the oligomer includes a prepolymer.

Specific examples of the oligomer include: acrylates such as urethane(meth)acrylate, polyester(meth)acrylate, and epoxy(meth)acrylate; a silicon resin such as siloxane; unsaturated polyester; and epoxy. Specific examples of the monomer include: a styrene-based monomer such as α-methylstyrene; and methyl(meth)acrylate, 2-ethylhexyl (meth)acrylate, dipentaerythritol hexa(meth)acrylate, dipentaerythritol penta(meth)acrylate, trimethylolpropane tri (meth)acrylate, urethane(meth)acrylate, and a polyol compound having two or more thiol groups in its molecule. The molecular weight of the curable compound for forming the hard coat layer falls within a range of, for example, 200 to 10,000.

A photopolymerization initiator is typically added to the ionizing radiation-curable resin monomer or oligomer. Examples of the photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropan-1-one, and any other thioxanthone-based compound.

In addition, a composition for forming the hard coat layer may contain a leveling agent. Examples of the leveling agent include fluorine- and silicone-based leveling agents.

The amount of the leveling agent is, for example, 0.05 part or less, preferably 0.02 part or less with respect to 100 parts of the solid content of the hard coat layer-forming material. When the amount falls within the range, the surface free energy can be achieved with additional ease.

In addition, the composition for forming the hard coat layer may contain an additive. Examples of the additive include fine particles, a filler, a dispersing agent, a plasticizer, a UV absorber, a surfactant, an antioxidant, and a thixotropic agent.

(4. Transparent Film)

The transparent film has only to be excellent in at least light transmittance for visible light and transparency. The light transmittance of the transparent film for visible light is preferably 80% or more, more preferably 90% or more. It should be noted that the light transmittance refers to a Y value subjected to color correction on the basis of spectrum data measured at a film thickness of 100 μm with a spectrophotometer (manufactured by Hitachi, Ltd., product name: "Model U-4100"). The haze value of the transparent film is preferably 3% or less, more preferably 1% or less. It should be noted that the haze value refers to a value measured in conformity with JIS-K7105.

An example of the transparent film is a plastic film obtained by forming a transparent polymer into a film. Examples of the transparent polymer include: ester-based polymers such as polyethylene terephthalate and polyethylene naphthalate; cellulose-based polymers such as diacetylcellulose and triacetylcellulose; carbonate-based polymers; acrylic resins such as an acrylic polymer, e.g., polymethyl methacrylate, an acrylic resin having an aromatic ring, and a lactone-modified acrylic resin; styrene-based polymers such as polystyrene and an acrylonitrile-styrene copolymer; olefin-based polymers such as polyethylene, polypropylene, polyolefin having a cyclic structure or a norbornene structure, and an ethylene-propylene copolymer; vinyl chloride-based polymers; amide-based polymers such as aromatic polyamide; imide-based polymers; sulfone-based polymers; polyethersulfone-based polymers; polyether ether ketone-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; and blended polymers obtained by mixing these polymers. As the transparent film, a film obtained by forming a formation material containing a cellulose-based polymer such as triacetylcellulose into a film, or an acrylic resin film is preferably used, and a cellulose-based polymer film is more preferably used.

The thickness of the transparent film is appropriately set. The thickness of the transparent film is typically about 10 μm to 500 μm, preferably 20 μm to 300 μm, more preferably 25 μm to 200 μm. A thickness within the range is advantageous in terms of, for example, strength, workability such as handleability, and thin-layer property. A refractive index intrinsic to the transparent film is typically 1.33 to 1.66, preferably 1.47 to 1.55. A film having an appropriate retardation value can be used as the transparent film depending on its applications.

As described later, the hard coat film of the present invention may be used in the form of a hard coat laminate by being laminated and bonded onto an optical film such as a polarizing plate. The use of, for example, a polarizer as the transparent film enables the construction of a hard coat polarizing plate (hard coat film having a polarizing function) in which a hard coat layer is directly formed on the polarizer. Similarly, the use of, for example, a retardation plate as the transparent film enables the construction of a hard coat retardation plate (hard coat film having an optical compensation function) in which a hard coat layer is directly formed on the retardation plate. In addition, the use of, for example, a protective film as the transparent film enables the construction of a hard coat protective film (hard coat film that also serves as the protective film) in which a hard coat layer is directly formed on the protective film. The hard coat polarizing plate can be formed by laminating such hard coat protective film on one surface, or each of both surfaces, of the polarizer. In this case, a film using, for example, triacetylcellulose, polycarbonate, an acrylic polymer, or an olefin-based polymer having a cyclic structure or a norbornene structure as a main component is preferably used as the transparent film to be used in the hard coat protective film.

(5. Interlayer Filler)

A known interlayer filler is appropriately used as the interlayer filler. The interlayer filler is preferably an active energy ray-curable resin. The active energy ray-curable resin is, for example, a resin that can cure with UV light, an electron beam, or the like, and specific examples thereof include an acrylic resin (an acrylate or urethane acrylate), an epoxy-based resin, a silicone resin, a rubber-based resin, and a xylene-based resin. Examples of the xylene-based resin include: hydrophilic resins such as an alkyl phenol-modified type resin, resol, and polyol; and hydrophobic resins. It should be noted that the interlayer filler is not limited to the active energy ray-curable resin and may be, for example, a thermosetting resin.

(6. Front Surface Plate)

A conventionally known plate can be used as the front surface plate. The material, thickness, and the like of the front surface plate can be appropriately selected depending on, for example, applications such as an image display apparatus.

(7. Method of Producing Hard Coat Film)

The hard coat film of the present invention may be, for example, a film obtained by: applying, onto the transparent film, the hard coat layer-forming material containing the solvent and the curable compound; and curing the hard coat layer-forming material. Hereinafter, a preferred aspect of a method of producing the hard coat film is described.

(Coating Film-Forming Step)

Any one of those exemplified above can be appropriately used as the transparent film. A transparent film made of a cellulose-based polymer such as triacetylcellulose is preferably used. The hard coat layer-forming material can be prepared by appropriately mixing the solvent and curable compound exemplified above.

The solvent may contain a good solvent for the transparent film, and can contain both the good solvent for the transparent film and a poor solvent therefor. When the solvent contains the good solvent and the poor solvent, their mixing ratio is preferably as follows: a content ratio (mass ratio) "good solvent:poor solvent" is 1:9 to 99:1. The curable compound can contain a low-molecular weight component having a molecular weight of 800 or less. When the curable compound contains a component except the low-molecular weight component having a molecular weight of 800 or less, the component is typically a compound having a molecular weight in excess of 800 (high-molecular weight component). For example, a hard coat layer-forming material, which contains a solvent containing cyclopentanone, and a curable compound containing a low-molecular weight component having at least one of an acrylate group and a methacrylate group, is used.

The low-molecular weight component and good solvent in the hard coat layer-forming material preferably satisfy relationships represented by the following formulae (3) and (4) in consideration of the thickness of a coating film.

$$Y \geq -4.274 \ln(X) + 11.311 \quad \text{Formula (3);}$$

$$Y \leq -4.949 \ln(X) + 15.474 \quad \text{Formula (4);}$$

Y represents b×t and X represents a×t. a represents the content ratio of the low-molecular weight component in the case where the total amount (in terms of mass) of the curable compound is defined as 1. Namely, the a is equal to the ratio of the mass of the low-molecular weight component in the hard coat layer-forming material to the mass of the curable compound in the hard coat layer-forming material. b represents the content ratio of the good solvent in the case where the total amount (in terms of mass) of the hard coat layer-forming material is defined as 1. Namely, the b is equal to the ratio of the mass of the good solvent in the hard coat layer-forming material to the mass of the hard coat layer-forming material. t represents the thickness (unit: μm) of the coating film, and the symbol "ln" in each of the formulae (3) and (4) represents a natural logarithm.

When the hard coat layer is formed by using the hard coat layer-forming material that satisfies both of the formulae (3) and (4), the following hard coat film can be obtained: over a range from the boundary between the hard coat layer and the transparent film or the vicinity thereof to a thickness-wise middle part of the hard coat layer, a refractive index continuously changes in the thickness direction. The foregoing is assumed to result from the permeating action and diffusing action of the solvent containing the good solvent and the curable compound containing the low-molecular weight component on the transparent film. It has been found that the hard coat layer-forming material that satisfies the relationships represented by the formulae (3) and (4) is used under the assumption that the amount of the good solvent and the amount of the low-molecular weight component may have large influences on the occurrence of the interference fringe of the hard coat film. The use of such hard coat layer-forming material can provide a hard coat film in which not only the occurrence of an interference fringe resulting from an interface at the boundary between the transparent film and the hard coat layer or the vicinity thereof but also the occurrence of an interference fringe resulting from the film component present in the hard coat layer is suppressed.

The a (content ratio of the low-molecular weight component) is preferably more than 0.3 and 1 or less, more preferably 0.4 or more and less than 1. The b (content ratio of the good solvent) is preferably 0.05 or more and 0.5 or less, more preferably 0.05 or more and 0.4 or less.

The ratio of the solid content (curable compound and additive) in the hard coat layer-forming material is preferably 20 mass % to 70 mass %, more preferably 30 mass % to 60 mass %, particularly preferably 35 mass % to 55 mass %. When the content of the solvent is excessively small, the dissolution of the transparent film becomes insufficient. On the other hand, when the content of the solvent is excessively large, the solvent permeates the transparent film to so large an extent that the transparent film may become cloudy, or two or more interfaces may be produced.

The viscosity (25° C.) of the hard coat layer-forming material is preferably 1 to 700 MPa·s, more preferably 2 to 500 MPa·s. The hard coat layer-forming material can be applied onto the transparent film with a coater such as a comma coater or a die coater. In addition, the hard coat layer-forming material can be applied onto the transparent film by a system such as casting or spin coating. When the transparent film is of a lengthy shape, the hard coat layer-forming material can be applied with a coater. The following may be adopted: while the lengthy transparent film wound around a roll is drawn and fed in the lengthwise direction of a production line, the hard coat layer-forming material is applied to the transparent film in the midst of the feeding to form the hard coat layer. The transparent film having formed thereon the hard coat layer is wound around the roll again. Such roll-to-roll winding system is excellent in productivity because the hard coat layer can be continuously formed on the transparent film.

The coating film can be formed on the transparent film by applying the hard coat layer-forming material onto the transparent film. The thickness of the coating film is appropriately set in consideration of the thickness of the hard coat layer to be formed. The thickness of the coating film may be larger than the thickness of the hard coat layer to be formed, and is, for example, 1 μm to 100 μm, preferably 4 μm to 40 μm. For example, when the hard coat layer-forming material is applied to the lengthy transparent film with a coater, the thickness of the coating film is adjusted by the ejection amount of the hard coat layer-forming material and the feeding speed of the transparent film.

(Curing Step)

After the hard coat layer-forming material has been applied, the coating film is preferably dried (that is, the solvent is preferably volatilized) before the coating film is cured (before the curable compound containing the low-molecular weight component is polymerized). In this case, the solvent can be caused to permeate the transparent film while the coating film is dried. A drying temperature is, for example, 30° C. to 100° C. A drying time is appropriately set depending on, for example, the kinds of the transparent film and the solvent, and the thickness of the coating film. The drying time is typically 30 seconds to 5 minutes.

After having been dried, the coating film is cured. When the curable compound is an ionizing radiation-curable resin monomer or oligomer, the coating film cures through the irradiation of the coating film with an energy ray in accordance with its kind. An apparatus for irradiating the coating film with the energy ray is, for example, a high-pressure mercury lamp, a halogen lamp, a xenon lamp, a nitrogen laser, an electron beam accelerator, or a radiation source for a radioactive element. The dose of the energy ray is appropriately set depending on, for example, the kinds of the curable compound and the photopolymerization initiator. The dose is, for example, about 50 to 5,000 mJ/cm$^2$ in terms of cumulative light quantity at a UV wavelength of 365 nm.

As described above, when the hard coat layer-forming material is applied onto the transparent film, the good solvent swells the transparent film, whereby the low-molecular weight component can be caused to permeate the transparent film and the film component can be diffused in the coating film. Thus, a mixed region in which the low-molecular weight component and the film component are mixed is produced in the vicinity of the boundary between the transparent film and the hard coat layer, and the amount of the film component can be reduced toward the surface of the coating film without the production of any interface at a thickness-wise middle part of the mixed region. The curing of the coating film provides a hard coat film free of any interface in the hard coat layer.

(Interlayer Filler-Forming Step)

An interlayer filler-forming step is the step of forming the interlayer filler on the surface of the hard coat layer. Any one of those exemplified above can be used as a formation material for the interlayer filler. A hard coat film in which the transparent film, the hard coat layer, and the interlayer filler are laminated in the stated order can be obtained by applying the formation material for the interlayer filler to the surface of the hard coat layer and drying or curing the material.

(Front Surface Plate-Attaching Step)

A front surface plate-attaching step is the step of attaching the front surface plate to the surface of the interlayer filler. Any one of those exemplified above can be used as a formation material for the front surface plate. A hard coat film in which the transparent film, the hard coat layer, the interlayer filler, and the front surface plate are laminated in the stated order can be obtained by, for example, attaching the formation material for the front surface plate to the surface of the formation material for the interlayer filler after the application of the formation material for the interlayer filler to the surface of the hard coat layer in the interlayer filler-forming step, and drying or curing the formation material for the interlayer filler.

(8. Application of Hard Coat Film)

The hard coat film can be used as a member to be provided on a portion in which one wishes to prevent a scratch. The hard coat film can be typically used as, for example, a protective member for the screen of an image display apparatus such as a liquid crystal display apparatus, a surface protective member for a touch panel, a cover member for meters, or an optical lens. When the hard coat film is used in an image display apparatus, the hard coat film is attached alone to the screen of the image display apparatus or is attached to an optical film incorporated into the screen. In addition, the hard coat film is incorporated into the image display apparatus in the form of a hard coat laminate by being laminated on various optical films. The hard coat film of the present invention is particularly useful as a clear hard coat film to be used in the front surface of a display such as a liquid crystal display apparatus.

Examples of the optical film on which the hard coat film is laminated include: a polarizer, a retardation plate, a brightness enhancement film, and a laminate thereof; a polarizing plate obtained by laminating a protective film on a polarizer; and an elliptical polarizing plate obtained by laminating a protective film and a retardation plate on a polarizer. The polarizer of the polarizing plate is, for example, a hydrophilic polymer film dyed with a dichromatic dye. The hard coat film and the optical film are typically bonded through a known pressure-sensitive adhesive or adhesive. Examples of the pressure-sensitive adhesive or adhesive include pressure-sensitive adhesives and adhesives each using an acrylic polymer, a silicone-based polymer, an ester-based polymer, a urethane-based polymer, an epoxy-based polymer, or a rubber-based polymer as a base polymer.

Examples of the image display apparatus into which the hard coat film of the present invention is incorporated include a liquid crystal display apparatus (LCD), a plasma display panel (PDP), an organic EL display (ELD), and a cathode-ray tube television.

EXAMPLES

Hereinafter, the present invention is described in more detail byway of Examples, but the present invention is by no means limited to Examples to be described below. It should be noted that all the terms "part(s)" and "%" refer to "part(s) by weight" and "wt %", respectively.

Example 1

To a resin solution (manufactured by DIC Corporation, trade name: "UNIDIC 17-806", solid content concentration: 80%), which was obtained by dissolving a UV-curable resin monomer or oligomer using urethane acrylate as a main component in butyl acetate, were added 5 parts of a photopolymerization initiator (manufactured by BASF, product name: "IRGACURE 906") and 0.01 part of a leveling agent (manufactured by DIC Corporation, product name: "GRANDIC PC4100") per 100 parts of a solid content in the solution. Cyclopentanone (hereinafter described as "CPN") and propylene glycol monomethyl ether (hereinafter described as "PGM") were added at a ratio of 45:55 to the compounded liquid so that the solid content concentration in the solution became 36%. Thus, a hard coat layer-forming material was produced. The hard coat layer-forming material was applied onto a transparent plastic film base material (cellulose triacetate film, manufactured by KONICA MINOLTA ADVANCED LAYERS, trade name: "KC4UY", thickness: 40 μm, refractive index: 1.48), to form a coating film so that the thickness of a hard coat after curing became 7.8 μm. Next, the coating film was dried at 90° C. for 1 minute, and was then irradiated with UV light having a cumulative light quantity of 300 mJ/cm$^2$ from a high-pressure mercury lamp to be subjected to curing treatment.

Example 2

To a resin solution (manufactured by DIC Corporation, trade name: "UNIDIC 17-806", solid content concentration: 80%), which was obtained by dissolving a UV-curable resin monomer or oligomer using urethane acrylate as a main component in butyl acetate, were added 5 parts of a photopolymerization initiator (manufactured by BASF, product name: "IRGACURE 906") and 0.02 part of a leveling agent (manufactured by DIC Corporation, product name: "GRANDIC PC4100") per 100 parts of a solid content in the solution. CPN and PGM were added at a ratio of 45:55 to the compounded liquid so that the solid content concentration in the solution became 36%. Thus, a hard coat layer-forming material was produced. The hard coat layer-forming material was applied onto a transparent plastic film base material (cellulose triacetate film, manufactured by KONICA MINOLTA ADVANCED LAYERS, trade name: "KC4UY", thickness: 40 μm, refractive index: 1.48), to forma coating film so that the thickness of a hard coat after curing became 7.5 μm. Next, the coating film was dried at 90° C. for 1 minute, and was then irradiated with UV light having a cumulative light quantity of 300 mJ/cm$^2$ from a high-pressure mercury lamp to be subjected to curing treatment.

Example 3

To a resin solution (manufactured by DIC Corporation, trade name: "UNIDIC 17-806", solid content concentration: 80%), which was obtained by dissolving a UV-curable resin monomer or oligomer using urethane acrylate as a main component in butyl acetate, were added 5 parts of a photopolymerization initiator (manufactured by BASF, product name: "IRGACURE 906") and 0.01 part of a leveling agent (manufactured by DIC Corporation, product name: "GRANDIC PC4100") per 100 parts of a solid content in the solution. CPN and PGM were added at a ratio of 45:55 to the compounded liquid so that the solid content concentration in the solution became 36%. Thus, a hard coat layer-forming material was produced. The hard coat layer-forming material was applied onto a transparent plastic film base material (cellulose triacetate film, manufactured by KONICA MINOLTA ADVANCED LAYERS, trade name: "KC4UY", thickness: 40 μm, refractive index: 1.48), to forma coating film so that the thickness of a hard coat after curing became 5.2 μm. Next, the coating film was dried at 90° C. for 1 minute, and was then irradiated with UV light having a cumulative light quantity of 300 mJ/cm$^2$ from a high-pressure mercury lamp to be subjected to curing treatment.

Comparative Example 1

To a product available under the trade name "Viscoat #300" from OSAKA ORGANIC CHEMICAL INDUSTRY LTD., which was a reaction product of pentaerythritol and acrylic acid, were added 5 parts of a photopolymerization initiator (manufactured by BASF, product name: "IRGACURE 906") and 0.01 part of a leveling agent (manufactured by DIC Corporation, product name: "GRANDIC PC4100") per 100 parts of a solid content in the product. Ethyl cellosolve acetate was added to the compounded liquid so that the solid content concentration in the solution became 50%. Thus, a hard coat layer-forming material was produced. The hard coat layer-forming material was applied onto a transparent plastic film base material (cellulose triacetate film, manufactured by KONICA MINOLTA ADVANCED LAYERS, trade name: "KC4UY", thickness: 40 μm, refractive index: 1.48), to form a coating film so that the thickness of a hard coat after curing became 7.2 μm. Next, the coating film was dried at 90° C. for 1 minute, and was then irradiated with UV light having a cumulative light quantity of 300 mJ/cm$^2$ from a high-pressure mercury lamp to be subjected to curing treatment.

Comparative Example 2

To a reaction product of pentaerythritol and acrylic acid (manufactured by OSAKA ORGANIC CHEMICAL INDUSTRY LTD., trade name: "Viscoat #300") were added 5 parts of a photopolymerization initiator (manufactured by BASF, product name: "IRGACURE 906") and 0.01 part of a leveling agent (manufactured by DIC Corporation, product name: "GRANDIC PC4100") per 100 parts of a solid content in the product. Cyclohexane was added to the compounded liquid so that the solid content concentration in the solution became 50%. Thus, a hard coat layer-forming material was produced. The hard coat layer-forming material was applied onto a transparent plastic film base material (cellulose triacetate film, manufactured by KONICA MINOLTA ADVANCED LAYERS, trade name: "KC4UY", thickness: 40 μm, refractive index: 1.48), to form a coating film so that the thickness of a hard coat after curing became 6.2 μm. Next, the coating film was dried at 90° C. for 1 minute, and was then irradiated with UV light having a cumulative light quantity of 300 mJ/cm$^2$ from a high-pressure mercury lamp to be subjected to curing treatment.

Comparative Example 3

To a resin solution (manufactured by DIC Corporation, trade name: "UNIDIC 17-806", solid content concentration: 80%), which was obtained by dissolving a UV-curable resin monomer or oligomer using urethane acrylate as a main component in butyl acetate, were added 5 parts of a photopolymerization initiator (manufactured by BASF, product name: "IRGACURE 906") and 0.05 part of a leveling agent (manufactured by DIC Corporation, product name: "GRANDIC PC4100") per 100 parts of a solid content in the solution. Butyl acetate, CPN, and PGM were added at a ratio of 12:80:8 to the solution so that the solid content concentration in the solution became 50%. Thus, a hard coat layer-forming material was produced. The hard coat layer-forming material was applied onto a transparent plastic film base material (cellulose triacetate film, manufactured by FUJI FILM Corporation, trade name: "FUJITAC TD60UL", thickness: 60 μm, refractive index: 1.48), to forma coating film so that the thickness of a hard coat after curing became 6.5 μm. Next, the coating film was dried at 90° C. for 1 minute, and was then irradiated with UV light having a cumulative light quantity of 300 mJ/cm$^2$ from a high-pressure mercury lamp to be subjected to curing treatment.

Comparative Example 4

To a resin solution (manufactured by DIC Corporation, trade name: "UNIDIC 17-806", solid content concentration:

80%), which was obtained by dissolving a UV-curable resin monomer or oligomer using urethane acrylate as a main component in butyl acetate, were added 5 parts of a photopolymerization initiator (manufactured by BASF, product name: "IRGACURE 906") and 0.03 part of a leveling agent (manufactured by DIC Corporation, product name: "GRANDIC PC4100") per 100 parts of a solid content in the solution. Butyl acetate, CPN, and PGM were added at a ratio of 12:80:8 to the solution so that the solid content concentration in the solution became 50%. Thus, a hard coat layer-forming material was produced. The hard coat layer-forming material was applied onto a transparent plastic film base material (cellulose triacetate film, manufactured by FUJIFILM Corporation, trade name: "FUJITAC TD60UL", thickness: 60 µm, refractive index: 1.48), to form a coating film so that the thickness of a hard coat after curing became 6.5 µm. Next, the coating film was dried at 90° C. for 1 minute, and was then irradiated with UV light having a cumulative light quantity of 300 mJ/cm² from a high-pressure mercury lamp to be subjected to curing treatment.

Comparative Example 5

To a resin solution (manufactured by DIC Corporation, trade name: "UNIDIC 17-806", solid content concentration: 80%), which was obtained by dissolving a UV-curable resin monomer or oligomer using urethane acrylate as a main component in butyl acetate, were added 5 parts of a photopolymerization initiator (manufactured by BASF, product name: "IRGACURE 906") and 0.03 part of a leveling agent (manufactured by DIC Corporation, product name: "GRANDIC PC4100") per 100 parts of a solid content in the solution. Butyl acetate, CPN, and PGM were added at a ratio of 12:80:8 to the solution so that the solid content concentration in the solution became 50%. Thus, a hard coat layer-forming material was produced. The hard coat layer-forming material was applied onto a transparent plastic film base material (cellulose triacetate film, manufactured by FUJIFILM Corporation, trade name: "FUJITAC TD60UL", thickness: 60 µm, refractive index: 1.48), to form a coating film so that the thickness of a hard coat after curing became 5.7 µm. Next, the coating film was dried at 90° C. for 1 minute, and was then irradiated with UV light having a cumulative light quantity of 300 mJ/cm² from a high-pressure mercury lamp to be subjected to curing treatment.

Comparative Example 6

To a resin solution (manufactured by DIC Corporation, trade name: "UNIDIC 17-806", solid content concentration: 80%), which was obtained by dissolving a UV-curable resin monomer or oligomer using urethane acrylate as a main component in butyl acetate, were added 5 parts of a photopolymerization initiator (manufactured by BASF, product name: "IRGACURE 906") and 0.01 part of a leveling agent (manufactured by DIC Corporation, product name: "GRANDIC PC4100") per 100 parts of a solid content in the solution. CPN and PGM were added at a ratio of 45:55 to the compounded liquid so that the solid content concentration in the solution became 36%. Thus, a hard coat layer-forming material was produced. The hard coat layer-forming material was applied onto a transparent plastic film base material (cellulose triacetate film, manufactured by KONICA MINOLTA ADVANCED LAYERS, trade name: "KC4UY", thickness: 40 µm, refractive index: 1.48), to forma coating film so that the thickness of a hard coat after curing became 4.0 µm. Next, the coating film was dried at 90° C. for 1 minute, and was then irradiated with UV light having a cumulative light quantity of 300 mJ/cm² from a high-pressure mercury lamp to be subjected to curing treatment.

Figure 5:
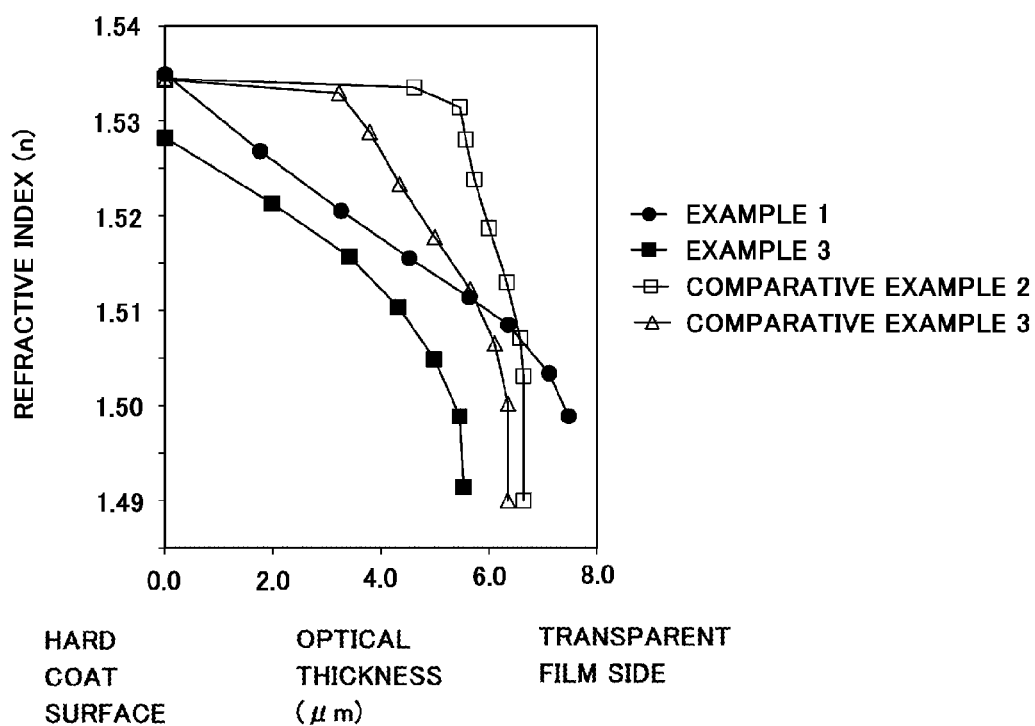
FIG. 5 is a graph showing data in Examples measured with a prism coupler.

Each of the sample films produced in Examples and Comparative Examples above was subjected to the following tests.
(Evaluation of Hard Coat Layer for its Surface Free Energy)
The surface free energy of a hard coat layer was measured by a drop method.
(Evaluation of Compatibility with the Interlayer Filler of Hard Coat Layer Based on Interlayer Filler Repellency)
A pressure-sensitive adhesive was transferred and formed onto the support side of each produced sample film, and then the resultant was attached onto an acrylic plate measuring 5 cm by 5 cm to produce a product. Each of the following solvent-free resins was dropped onto the film and uniformly applied to the entire surface with a spin coater (1,500 rpm, 15 sec). After 30 minutes of still standing, a repelling amount from any appropriate position in each of the four sides of the sample (distance from each side portion to the portion in which the resin was most repelled) was measured with calipers for each side portion, and then the average repelling width of the four positions was defined as a measured value for each resin. Of the measured values for the respective resins, the measured value having the highest average repelling width was defined as an evaluation value for interlayer filler repellency. It should be noted that the surface free energies of the following solvent-free resins were measured by a pendant-drop method.
UV-Curable Adhesive A
(Surface free energy: 40.7 mN/m)
UV-Curable Adhesive B
(Surface free energy: 45.2 mN/m)
UV-Curable Adhesive C
(Surface free energy: 42.3 mN/m)
Whether the produced sample film was compatible with the interlayer filler was evaluated in accordance with the evaluation value for interlayer filler repellency on the basis of the following criteria.
○: The measured value was less than 10 mm.
Δ: The measured value was 10 mm or more and less than 20 mm.
x: The measured value was 20 mm or more.
(Evaluation for Refractive Index Change Gradient a)
Each of the produced sample films was evaluated for its refractive index change gradient a by measuring the refractive index of the hard coat layer through measurement in the entire region in the thickness direction of the hard coat layer from an interface between the transparent film and the hard coat layer with a prism coupler (trade name: "Prism Coupler SPA-4000," manufactured by Sairon Technology Inc.).
Conditions for the measurement with the prism coupler are as described below.
Light source: 532.0 nm
Mode: TE
Angle: −5.00 to 2.00
Analysis mode: Index Profile
FIG. 5 shows data on the measurement with the prism coupler.
(Evaluation for Presence or Absence of Interference Fringe)
A black acrylic plate (manufactured by MITSUBISHI RAYON CO., LTD., thickness: 2.0 mm) was attached to the rear surface of the transparent film of each of the produced sample films through a transparent acrylic pressure-sensitive adhesive having a thickness of about 20 µm. The interference fringe of the surface of the hard coat film was visually observed in a dark room with a three-wavelength light source. The results of the observation of the interference fringes were differentiated in accordance with the following criteria.
○: No interference fringe was viewed.
Δ: An interference fringe was slightly viewed.
x: An interference fringe was clearly viewed.
(Measurement of Refractive Index Change Gradient)

The refractive index of the hard coat layer was continuously measured in its thickness direction in the same manner as in the case of the (Evaluation for refractive index change gradient a), the refractive index $n_A$ on the surface of the hard coat layer and the refractive index $n_B$ of the portion of the transparent film in contact with the interface were measured, and the refractive index change gradient was calculated.
(Evaluation for Presence or Absence of White Haze)

A black acrylic plate (manufactured by MITSUBISHI RAYON CO., LTD., thickness: 2.0 mm) was attached to the rear surface of the transparent film of each of the hard coat films of Examples and Comparative Examples through a transparent acrylic pressure-sensitive adhesive having a thickness of about 20 μm. The surface external appearance of the hard coat film was visually observed in a dark room with a three-wavelength light source. The results of the observation of white haze were differentiated in accordance with the following criteria.
○: No white haze is viewed.
x: White haze is viewed.
(Evaluation for Scratch Resistance)

A hard coat layer was evaluated for its scratch resistance on the basis of the following test contents.
(1) A sample measuring 150 mm by 50 mm was cut out of the surface of a hard coat film, and was then mounted on a glass plate with its surface on which the hard coat layer had not been formed directed downward.
(2) A steel wool #0000 was uniformly attached to a smooth section of a cylinder having a diameter of 11 mm, and then a load of 1.5 kg was reciprocated on the surface of the sample 10 times at a speed of about 100 mm/sec. After that, the number of flaws produced in the surface of the sample was visually counted and judged on the basis of the following indices.
○: The number of flaws is 4 or less.
x: The number of flaws is 5 or more.

more. As a result, the following effect is obtained. The occurrence of an interference fringe is prevented, and its scratch resistance does not reduce and an external appearance failure such as white haze does not occur. In addition, according to the hard coat film of the present invention, its application property is improved by setting the surface free energy of the hard coat layer to 30 mN/m or more even when no surface modification treatment is performed. Accordingly, the hard coat film can be compatible with interlayer filling. As described above, according to one embodiment of the present invention, the prevention of the interference fringe, the reduction of the scratch resistance, and the white haze, and compatibility with the interlayer filling, the prevention and the ability having been difficult to satisfy simultaneously heretofore, can be simultaneously satisfied.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A hard coat film, comprising:
a transparent film; and
a hard coat layer formed on the transparent film,
wherein:
the hard coat layer has a surface free energy of 30 mN/m or more;
the hard coat film has a mixed region in which a component of the transparent film and a component of the hard coat layer are mixed;
a refractive index of the mixed region continuously changes toward a thickness direction of the hard coat film; and
a refractive index change gradient a (μm$^{-1}$) specified in the formula (1) satisfies a relationship of 0.003≤a≤0.018:

$$a=|n_A-n_B|/L \quad (1)$$

in the formula (1), $n_A$ represents a refractive index intrinsic to the hard coat layer, $n_B$ represents a refractive index intrinsic to the transparent film, and L represents a thickness (μm) of the mixed region.

TABLE 1

| | | Amount of leveling agent | Thickness (μm) | Surface free E (mN/m) | Compatibility with interlayer filling | Interference fringe | Refractive index change gradient a | White haze | Scratch resistance |
|---|---|---|---|---|---|---|---|---|---|
| Comparative Example | 1 | 0.01 | 7.2 | 34.8 | ○ | x | — | ○ | ○ |
| | 2 | 0.01 | 6.2 | 34.8 | ○ | x | 0.021 | ○ | ○ |
| | 3 | 0.05 | 6.5 | 26.5 | x | ○ | 0.014 | ○ | ○ |
| | 4 | 0.03 | 6.5 | 28.4 | Δ | ○ | 0.014 | ○ | ○ |
| | 5 | 0.03 | 5.7 | 28.4 | Δ | ○ | 0.017 | ○ | ○ |
| | 6 | 0.01 | 4.0 | Omitted | Omitted | — | 0.010 | x | x |
| Example | 1 | 0.01 | 7.8 | 34.8 | ○ | ○ | 0.003 | ○ | ○ |
| | 2 | 0.02 | 7.5 | 31.6 | ○ | ○ | 0.003 | ○ | ○ |
| | 3 | 0.01 | 5.2 | 34.8 | ○ | ○ | 0.007 | ○ | ○ |

The hard coat film of the present invention can be utilized as a member for forming, for example, optical films, image display apparatus, optical lenses, and meters.

In the hard coat film of the present invention, the refractive index continuously changes in the thickness direction of the hard coat film and the refractive index change gradient is controlled to fall within a certain range. In addition, the surface free energy of the hard coat layer is 30 mN/m or 2. A hard coat film according to claim 1, wherein the hard coat film has an interface produced by the component of the transparent film and the component of the hard coat layer, and the interface is detectable by analysis of a reflection spectrum.

3. A hard coat film according to claim 1, wherein a surface of the hard coat layer has attached thereonto a front surface plate through an interlayer filler.

4. A hard coat film according to claim 1, wherein the $n_A$ and the $n_B$ satisfy a relationship of $0 \leq |n_A - n_B| \leq 0.42$.

5. A hard coat film according to claim 1, wherein the thickness L of the mixed region is 2.0 μm or more.

6. A hard coat film according to claim 1, wherein the $n_A$ and the $n_B$ satisfy a relationship of $n_B < n_A$.

7. A hard coat film according to claim 6, wherein the $n_A$ satisfies a relationship of $1.33 \leq n_A \leq 1.90$.

8. A hard coat film according to claim 6, wherein the $n_B$ satisfies a relationship of $1.33 \leq n_B \leq 1.66$.

9. A polarizing plate, comprising the hard coat film according to claim 1.

10. An image display apparatus, comprising the hard coat film according to claim 1.

* * * * *